United States Patent
Aoyagi et al.

(10) Patent No.: US 8,532,708 B2
(45) Date of Patent: Sep. 10, 2013

(54) ACCESS TYPE SETTING APPARATUS, MOBILE COMMUNICATION SYSTEM, AND ACCESS TYPE SETTING METHOD

(75) Inventors: Kenichiro Aoyagi, Yokosuka (JP); Takeshi Okamoto, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/395,349

(22) PCT Filed: Sep. 10, 2010

(86) PCT No.: PCT/JP2010/065632
§ 371 (c)(1),
(2), (4) Date: Apr. 25, 2012

(87) PCT Pub. No.: WO2011/030857
PCT Pub. Date: Mar. 17, 2011

(65) Prior Publication Data
US 2012/0208544 A1    Aug. 16, 2012

(30) Foreign Application Priority Data
Sep. 11, 2009  (JP) .................................. 2009-210838

(51) Int. Cl.
*H04B 1/38*    (2006.01)
(52) U.S. Cl.
USPC ............ 455/561; 455/446; 455/418; 370/329
(58) Field of Classification Search
USPC ......................... 455/446, 418, 561; 370/329
See application file for complete search history.

(56) References Cited

U.S. PATENT DOCUMENTS

| | | | |
|---|---|---|---|
| 2002/0176364 A1* | 11/2002 | Nakamura et al. | 370/243 |
| 2007/0270151 A1* | 11/2007 | Claussen et al. | 455/444 |
| 2007/0287464 A1* | 12/2007 | Hamamoto et al. | 455/447 |
| 2009/0187690 A1 | 7/2009 | Smart et al. | |
| 2010/0128620 A1 | 5/2010 | Inoue et al. | |
| 2010/0167771 A1* | 7/2010 | Raghothaman et al. | 455/501 |

FOREIGN PATENT DOCUMENTS

| | | |
|---|---|---|
| JP | 2009 171584 | 7/2009 |
| WO | 2008 136418 | 11/2008 |

OTHER PUBLICATIONS

3GPP TSG RAN WG1 Meeting #51 R1-074539, "LS on Status of Home Node B work in RAN4," RAN4, Total 2 Pages, (Nov. 5-9, 2007).

3GPP TSG-RAN WG4 Meeting #51 xR4-092118, "Enhanced HNB interference coordination based on network control," NTT DOCOMO, Vodafone, Qualcomm Europe, Total 2 Pages, (May 4-8, 2009).

3GPP TS 22.220 V11.4.0, "$3^{rd}$ Genertation Partnership Project; Technical Specification Group Services and System Aspects; Service requirements for Home Node B (HNB) and Home eNode B (HeNB)," Total 25 Pages, (Dec. 2011).

(Continued)

*Primary Examiner* — Danh Le
(74) *Attorney, Agent, or Firm* — Oblon, Spivak, McClelland, Maier & Neustadt, L.L.P.

(57) ABSTRACT

The access type setting apparatus 1 according to the present invention includes a calculation unit 12 configured to calculate an amount of interference from the femtocell #a to the macrocell #11 and a determination unit 13 configured to determine the access type (Close/Hybrid/Open) to be set in the radio base station HeNB#a/HNB#a configured to manage the femtocell #a.

8 Claims, 3 Drawing Sheets

(56) References Cited

OTHER PUBLICATIONS

3 GPP TS 25.331 V11.0.0, "3$^{rd}$ Generation Partnership Project; Technical Specification Group Radio Access Network; Radio Resoursce Control (RRC); Protocol specification," Total 1911 Pages, (Dec. 2011).

3GPP TS 25.304 V10.3.0, "3$^{rd}$ Generation Partnership Project; Technical Specification Group Radio Access Network; User Equipment (UE) procedures in idle mode and procedures for cell reselection in connected mode," Total 52 Pages, (Dec. 2011).

3GPP TS 25.367 V10.0.0, "3$^{rd}$ Generation Partnership Project; Technical Specification Group Radio Access Network; Mobility procedures for Home Node B (HNB); Overall description," Total 14 Pages, (Mar. 2011).

International Search Report Issued Oct. 19, 2010 in PCT/JP10/65632 Filed Sep. 10, 2010.

\* cited by examiner

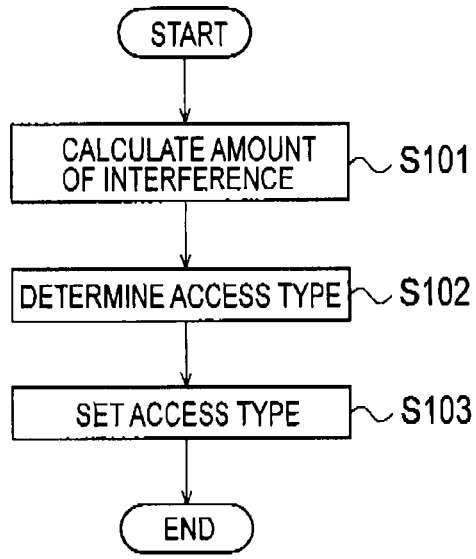
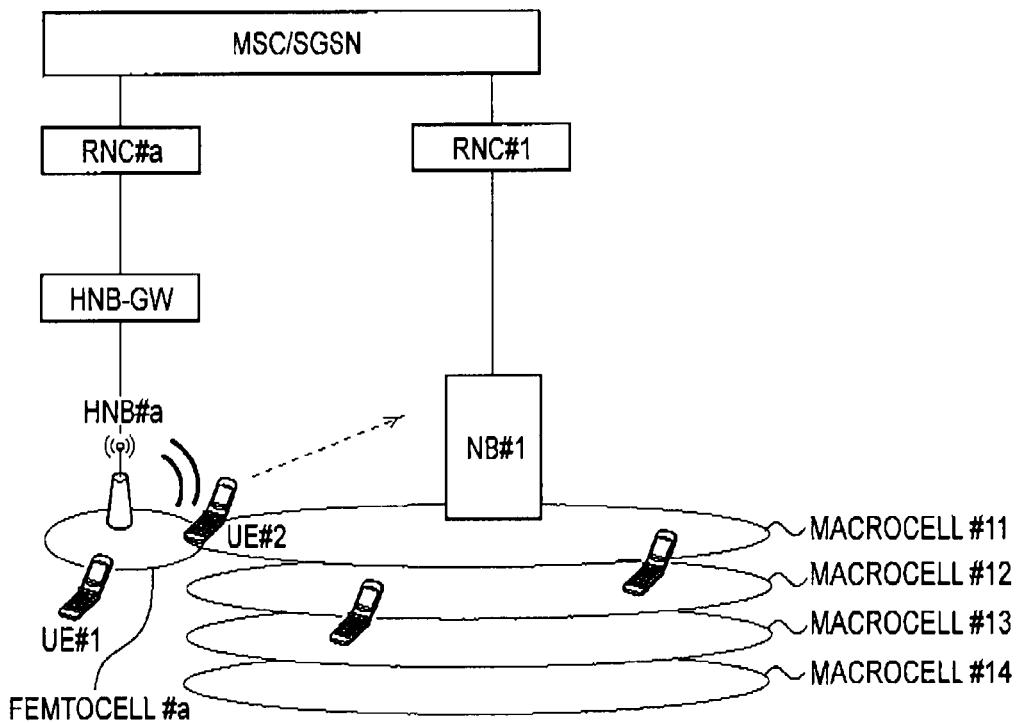

ACCESS TYPE SETTING APPARATUS, MOBILE COMMUNICATION SYSTEM, AND ACCESS TYPE SETTING METHOD

TECHNICAL FIELD

The present invention relates to an access type setting apparatus, a mobile communication method, and an access type setting method.

BACKGROUND ART

In a conventional mobile communication system, a radio base station HeNB (Home eNB)/HNB (Home NodeB) managing femtocell(s) can set radio parameters such as used frequency and used scrambling code using a Plug-and-Play function, etc. to reduce interference with a neighboring macrocell, other femtocells or the like.

The radio base station HeNE/HNB can exclusively or preferentially provide a communication service only to a mobile station UE registered in the managing femtocell, i.e., a mobile station UE belonging to a predetermined CSG (Closed Subscriber Group).

PRIOR ART DOCUMENTS

Non-Patent Documents

NON-PATENT DOCUMENT 1: 3GPP TS22.220
NON-PATENT DOCUMENT 2: 3GPP TS25.331
NON-PATENT DOCUMENT 3: 3GPP TS25.304
NON-PATENT DOCUMENT 4: 3GPP TS25.367

SUMMARY OF THE INVENTION

However, the mobile communication system has the following problem under an environment where a femtocell and a macrocell geographically overlap with each other at a certain area. Specifically, in the certain area, in spite that a mobile station UE not belonging to the CSG of the femtocell is not allowed to access the femtocell, the UE may fail to perform communications in the macrocell due to interference from the femtocell.

The present invention has been made in view of the above problem and an objective thereof is to provide an access type setting apparatus, a mobile communication system, and an access type setting method that are capable of preventing a problem that a mobile station UE in an area where a femtocell and a macrocell geographically overlap with each other not allowed to access the femtocel fails to perform communications in the macrocell.

The first aspect of the present invention is summarized in that an access type setting apparatus provided in a mobile communication system configured to allow a macrocell and a femtocell to geographically overlap with each other, the access type setting apparatus including: a calculation unit configured to calculate an amount of interference from the femtocell to the macrocell; and a determination unit configured to determine an access type to be set in a radio base station configured to manage the femtocell based on the amount of interference.

The second aspect of the present invention is summarized in that a mobile communication system configured to allow a macrocell and a femtocell to geographically overlap with each other, the mobile communication system comprising a radio access network device, wherein the radio access network device includes: a calculation unit configured to calculate an amount of interference from the femtocell to the macrocell; and a determination unit configured to determine an access type to be set in a radio base station configured to manage the femtocell based on the amount of interference.

The third aspect of the present invention is summarized in that a mobile communication system configured to allow a macrocell and a femtocell to geographically overlap with each other, the mobile communication system comprising a core network device, wherein the core network device includes: a calculation unit configured to calculate an amount of interference from the femtocell to the macrocell; and a determination unit configured to determine an access type to beset in a radio base station configured to manage the femtocell based on the amount of interference.

The fourth aspect of the present invention is summarized in that a mobile communication system configured to allow a macrocell and a femtocell to geographically overlap with each other, the mobile communication system comprising a radio gateway device, wherein the radio gateway device includes: a calculation unit configured to calculate an amount of interference from the femtocell to the macrocell; and a determination unit configured to determine an access type to be set in a radio base station configured to manage the femtocell based on the amount of interference.

The fifth aspect of the present invention is summarized in that a mobile communication system configured to allow a macrocell and a femtocell to geographically overlap with each other, wherein a radio base station configured to control the femtocell includes: a calculation unit configured to calculate an amount of interference from the femtocell to the macrocell; and a determination unit configured to determine an access type to be set in the radio base station based on the amount of interference.

The sixth aspect of the present invention is summarized in that an access type setting method for setting an access type to a radio base station configured to manage a femtocell in a mobile communication system configured to allow a macrocell and the femtocell to geographically overlap with each other, the method comprising the steps of: calculating an amount of interference from the femtocell to the macrocell; and determining the access type to be set in the radio base station configured to manage the femtocell based on the amount of interference.

BRIEF DESCRIPTION OF THE DRAWINGS

FIG. 3 is a flowchart showing operations of the access type setting apparatus according to the first embodiment of the present invention.

FIG. 4 is an overall configurational view of a mobile communication system according to a first modification of the present invention.

MODES FOR CARRYING OUT THE INVENTION (Configuration of Mobile Communication System According to First Embodiment of the Present Invention)

A configuration of a mobile communication system according to a first embodiment of the present invention is described with reference to FIG. 1 and FIG. 2.

The mobile communication system according to the present embodiment is a mobile communication system of an LTE (Long Term Evolution) scheme. As shown in FIG. 1, the mobile communication system includes an exchange apparatus MME (Mobile Management Entity), a radio gateway device HeNB-GW, a radio base station eNB#1 configured to manage macrocells #11 to #14, and a radio base station HeNB#a configured to manage a femtocell #a.

Here, the radio base station HeNB#a is configured to be able to set an access type (i.e., access mode) in the radio base station HeNB#a or each femtocell managed by the radio base station HeNB#a by means of Plug-and-Play and the like at a predetermined timing.

The access type may be an access type of a CSG defining what kind of mode of access is permitted from a mobile station UE to the radio base station HeNB#a (or the femtocell #a managed by the radio base station HeNB#a and the like). Three types of "Close", "Hybrid", and "Open" can be set as the access type of the CSG.

"Close" is an access type in which only a mobile station UE belonging to the CSG of the radio base station HeNB#a (or the femtocell #a managed by the radio base station HeNB#a and the like) is permitted to make the access. "Hybrid" is an access type differentiated in service. Specifically, the mobile station UE belonging to the CSG of the radio base station HeNB#a (or the femtocell #a managed by the radio base station HeNB#a and the like) is permitted to perform high quality communications while other mobile UEs are permitted to perform best effort quality communications (access). "Open" is an access type in which every mobile station UE is allowed to make an access as in a macrocell.

The access type may be a restrictive access type such as "ACCESS CLASS BARRED" and "CELL BARRED".

The mobile communication system according to the present embodiment is provided with an access type setting apparatus 1 that can set the access type in the radio base station HeNB#a (or the femtocell #a managed by the radio base station HeNB#a and the like).

The access type setting apparatus 1 may be provided in an access network device such as a radio base station eNB#1, in a core network such as the exchange apparatus MME, in the radio gateway device HeNB-GW, or in the radio base station HeNB#a.

Figure 2:
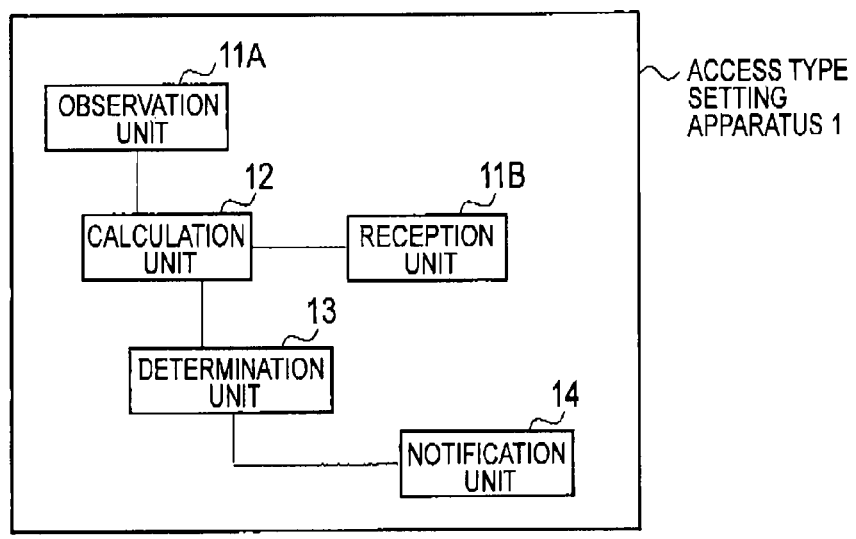
FIG. 2 is a functional block diagram of an access type setting apparatus according to the first embodiment.

As shown in FIG. 2, the access type setting apparatus 1 includes an observation unit 11A, a reception unit 11B, a calculation unit 12, a determination unit 13, and a notification unit 14.

The observation unit 11B is configured to observe radio qualities of a surrounding macrocell, other femtocells, and the like.

The reception unit 11B is configured to receive "Dedicated Measurement" and "Measurement Report". "Dedicated Measurement" is received from the surrounding radio base station HeNB/eNB and indicates radio qualities in a surrounding macrocell, other femtocells, and the like. "Measurement Report" is received from one or a plurality of mobile stations UE located in the surrounding macrocell and other femtocells.

The calculation unit 12 is configured to calculate an amount of interference from the femtocell #a to another macrocell (e.g., macrocell #11). The calculation is based on the radio quality observed by the observation unit 11A, a radio quality included in the measurement report received by the reception unit 11B, or the like.

The determination unit 13 is configured to determine the access type (Close/Hybrid/Open) to be set in the radio base station HeNB#a configured to manage the femtocell #a (or the femtocell #a) based on the amount of interference calculated by the calculation unit 12 and set the access type at a predetermined timing (at a start-up of the radio base station HeNB, periodically, or when a certain trigger is detected).

Figure 1:
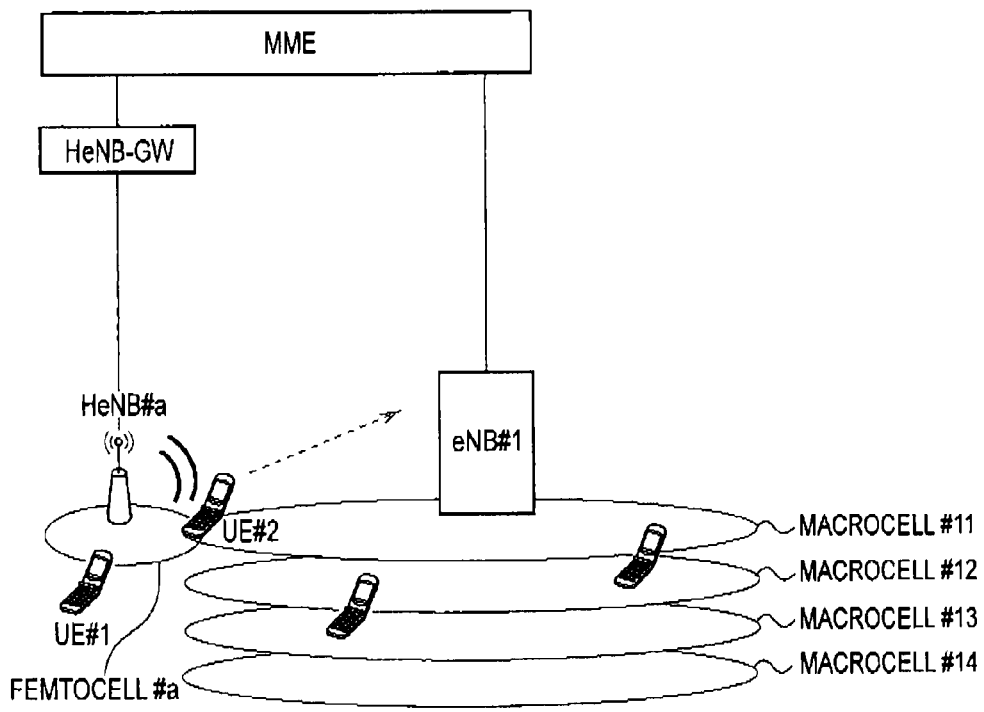
FIG. 1 is an overall configurational view of a mobile communication system according to a first embodiment of the present invention.

In the example of FIG. 1, the femtocell #a and the macrocell #11 partially overlap with each other geographically. In such an environment, while a mobile station UE #1 is performing communications in the femtocell #a managed by the radio base station HeNB#a of which the access type is set to "Close", a mobile station UE #2 may fail to perform communications in the macrocell #11 due to an influence of the interference from the femtocell #a.

Thus, for example the determination unit 13 may be configured to determine to set the access type of the radio base station HeNB#a (or the femtocell #a) to "Open" or "Hybrid" when the amount of interference from the femtocell #a to the other macrocell (e.g. macrocell #11) exceeds a predetermined amount of interference.

The determination unit 13 may be configured to determine to allow the access type of the radio base station HeNB#a (or the femtocell #a) to be set to any one of "Open", "Hybrid", and "Close" when the amount of interference from the femtocell #a to the other macrocell (e.g., macrocell #11) does not exceed the predetermined amount of interference.

The determination unit 13 may be configured to determine the access type to be set in the radio base station HeNB#a based on an instruction from a predetermined terminal (e.g., a mobile station UE of an owner of the radio base station HeNB#a/HNB#a) when two or more access types are selected (e.g., both "Open" and "Hybrid" can be selected) as the access types settable in the radio base station HeNB#a configured to manage the femtocell #a.

The notification unit 14 is configured to notify, in the case where two or more access types settable for the radio base station HeNB#a configured to manage the femtocell #a are selected, the predetermined terminal (e.g., the mobile station UE of the owner of the radio base station HeNB#a/HNB#a) of the selection and wait for the instruction.

The notification unit 14 may perform the notification in any one of the following method: by sending an e-mail, an SMS (Short Message Service) message, voice call, a dedicated control signaling, broadcasted information, or the like; by displaying the notification on a display of the radio base station HeNB; by outputting voice or light from the radio base station HeNB; or by displaying the notification on a predetermined web page.

(Operation of Mobile Communication System According to First Embodiment of the Present Invention)

Operations of the mobile communication system according to the first embodiment of the present invention, more specifically, operations of the access type setting apparatus 1 according to the first embodiment of the present invention is described with reference to FIG. 3.

As shown in FIG. 3, the access type setting apparatus 1 calculates the amount of interference from the femtocell to the macrocell #11 in Step S101.

In Step S102, the access type setting apparatus 1 determines the access type (e.g., Close/Hybrid/Open) to be set in the radio base station HeNB#a (or the femtocell #a) based on the calculated amount of interference.

In Step S103, the access type setting apparatus 1 sets the determined access type in the radio base station HeNB#a at a predetermined timing.

(Advantageous Effect of Mobile Communication System According to First Embodiment of the Present Invention)

In the mobile communication system according to the first embodiment of the present invention, the access type of the HeNB#a (or the femtocell #a) is set to "Open" or "Hybrid" when the amount of interference from the femtocell #a to the macrocell #11 exceeds the predetermined amount of interference. Thus, even when the mobile station UE in an area where the femtocell #a and the macrocell #11 overlap with each other cannot perform communications in the macrocell #11 due to the interference from the femtocell #a, the mobile station UE can perform communications in the femtocell #a.

(First Modification)

A first modification of the mobile communication system according to the first embodiment of the present invention is described with reference to FIG. 4. The mobile communication system according to the first modification is described below while focusing on the difference from the mobile communication system according to the first embodiment described above.

The mobile communication system according to the first modification is a mobile communication system of a WCDMA scheme. As shown in FIG. 4, the mobile communication system includes an exchange apparatus MSC/SGSN, a radio gateway device HNB-GW, a radio base station NB #1 configured to manage macrocells #11 to #14, and the radio base station HNB #a configured to manage the femtocell #a.

In the mobile communication system according to the first modification, the access type setting apparatus 1 may be provided in a radio access network device such as the radio base station NB #1 and a radio network control station RNC, in a core network such as the exchange apparatus MSC/SGSN, in the radio gateway device HNB-GW, or in the radio base station HNB #a.

(Second Modification)

Figure 5:
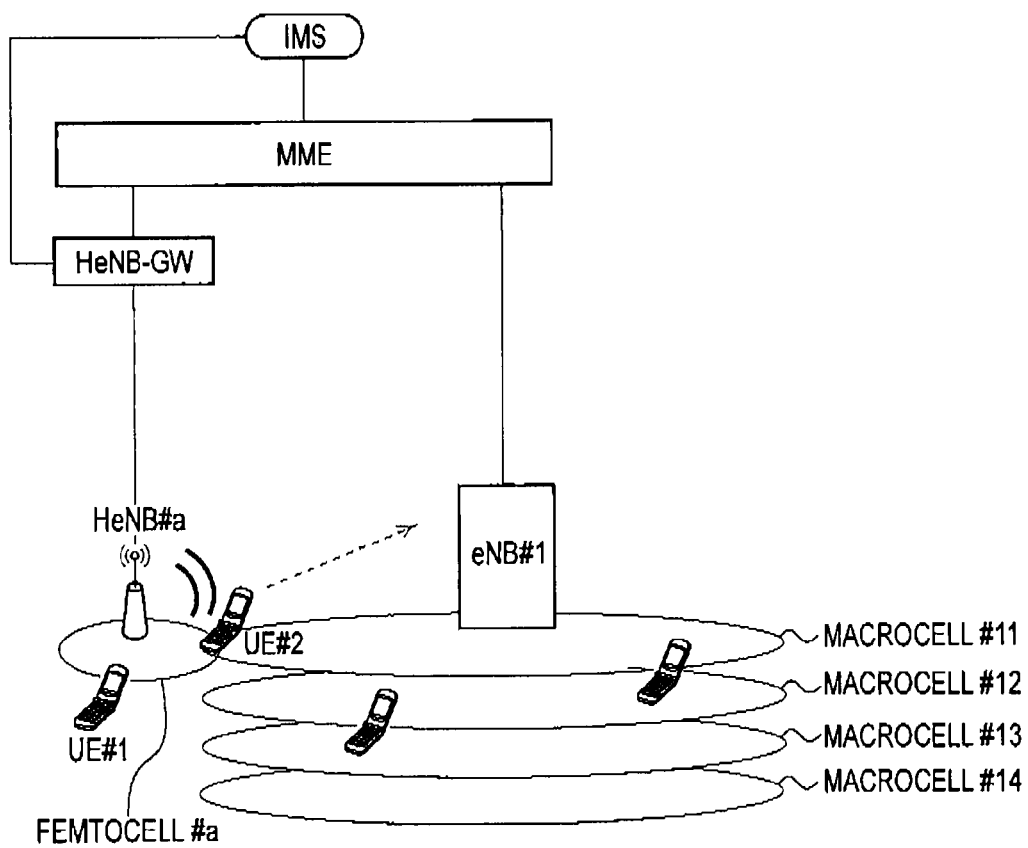
FIG. 5 is an overall configurational view of a mobile communication system according to a second modification of the present invention.

A second modification of the mobile communication system according to the first embodiment of the present invention is described with reference to FIG. 5. The mobile communication system according to the second modification is described below while focusing on the difference from the mobile communication system according to the first embodiment described above.

The mobile communication system according to the second modification is a mobile communication system of an LTE scheme. As shown in FIG. 5, the mobile communication system includes an IMS (IP Multimedia Subsystem), the exchange apparatus MME, the radio gateway device HeNB-GW, the radio base station eNB#1 configured to manage the macrocells #11 to #14, and the radio base station HeNB#a configured to manage the femtocell #a.

In the mobile communication system according to the second modification, the access type setting apparatus 1 described above may be provided in a radio access network such as the radio base station eNB#1, a core network such as a device in the IMS and the exchange apparatus MSC/SGSN, in the radio gateway device HeNB-GW, or in the radio base station HeNB#a.

The above aspects of this embodiment may be expressed as follows.

A first aspect of the embodiment is summarized as follows. The access type setting apparatus 1 is provided in the mobile communication system configured in such a manner that the macrocell #11 and the femtocell #a are able to geographically overlap with each other. The access type setting apparatus 1 includes the calculation unit 12 configured to calculate an amount of interference from the femtocell #a to the macrocell #11 and the determination unit 13 configured to determine the access type (Close/Hybrid/Open) to be set in the radio base station HeNB#a/HNB#a configured to manage the femtocell #a.

In the first aspect of the embodiment, the determination unit 13 may be configured to determine the access type to be set in the radio base station HeNB#a configured to manage the femtocell #a based on an instruction from the predetermined terminal (e.g., the mobile station UE of the owner of the radio base station HeNB#a/HNB#a) when a plurality of access types settable in the radio base station HeNB#a are selected.

In the first aspect of the embodiment, the calculation unit 12 may be configured to calculate the amount of interference based on the "Measurement Report" from a mobile station UE located in the macrocell 11. Alternatively, the calculation unit 12 maybe configured to calculate the amount of interference based on the "Dedicated Measurement (Measurement Report)" from the radio base station eNB#1 configured to manage the macrocell #11.

A second aspect of the embodiment is summarized as follows. The mobile communication system configured to allow that the macrocell #11 and the femtocell #a to geographically overlap with each other includes a radio access network device (e.g., the radio base station eNB/NB, the radio network control station RNC, or the like). The radio access network device includes the calculation unit 12 configured to calculate an amount of interference from the femtocell #a to the macrocell #11 and the determination unit 13 configured to determine the access type (Close/Hybrid/Open) to be set in the radio base station HeNB#a/HNB#a configured to manage the femtocell #a.

A third aspect of the embodiment is summarized as follows. The mobile communication system configured to allow the macrocell #11 and the femtocell #a to geographically overlap with each other and includes a core network device (e.g., the exchange apparatus MME/MSC/SGSN or the like). The radio access network device includes the calculation unit 12 configured to calculate an amount of interference from the femtocell #a to the macrocell #11 and the determination unit 13 configured to determine the access type (e.g., Close/Hybrid/Open or the like) to be set in the radio base station HeNB#a/HNB#a configured to manage the femtocell #a.

A fourth aspect of the embodiment is summarized as follows. The mobile communication system to allow the macrocell #11 and the femtocell #a to geographically overlap with each other includes the radio gateway device HeNB-GW/HNB-GW. The radio gateway device HeNB-GW/HNB-GW includes the calculation unit 12 configured to calculate an amount of interference from the femtocell #a to the macrocell #11 and the determination unit 13 configured to determine the access type (Close/Hybrid/Open) to be set in the radio base station HeNB#a/HNB#a configured to manage the femtocell #a.

A fifth aspect of the embodiment is summarized as follows. In the mobile communication system configured to allow the macrocell #11 and the femtocell #a to geographically overlap with each other, the radio base station HeNB#a/HNB#a configured to manage the femtocell #a includes the calculation unit 12 configured to calculate an amount of interference from the femtocell #a to the macrocell #11 and the determination unit 13 configured to determine the access type (Close/Hybrid/Open) to be set in the radio base station HeNB#a/HNB#a.

In the second to the fifth aspects of the invention, the determination unit 13 may determine as the access type, the access type (Close/Hybrid/open) of the CSG or restrictive access type (ACCESS CLASS BARRED/CELL BARRED).

A sixth aspect of the embodiment is summarized as follows. An access type setting method for setting an access type (Close/Hybrid/Close) in the radio base station HeNB#a/HNB#a in the mobile communication system configured to allow the macrocell #11 and the femtocell #a to geographically overlap with each other includes the steps of calculating the amount of interference from the femtocell #a to the macrocell #11, and determining the access type (Close/Hybrid/Open) to be set in the radio base station HeNB#a/HNB#a configured to manage the femtocell #a based on the amount of interference.

Note that the above described operations of the access type setting apparatus 1 may be implemented by hardware, may be implemented by a software module executed by a processor, or may be implemented by a combination of both.

The software module may be provided in any type of storage medium such as a RAM (Random Access Memory), a flash memory, a ROM (Read Only Memory), an EPROM (Erasable Programmable ROM), an EEPROM (Electronically Erasable and Programmable ROM), a register, a hard disk drive, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC maybe provided in the access type setting apparatus 1. Also, the storage medium and the processor maybe provided in the access type setting apparatus 1 as a discrete component.

Hereinabove, the present invention has been described in detail using the above embodiment; however, it is apparent to those skilled in the art that the present invention is not limited to the embodiment described herein. Modifications and variations of the present invention can be made without departing from the scope of the present invention defined by the description of the scope of claims. Thus, what is described herein is for illustrative purpose, and has no intention whatsoever to limit the present invention.

Note that the entire content of Japanese Patent Application No. 2009-210838 (filed on Sep. 11, 2009) is incorporated herein by reference.

INDUSTRIAL APPLICABILITY

The present invention enables prevention of a problem that a mobile station UE located in an area where a femtocell and a macrocell geographically overlap with each other not allowed to access the femtocell fails to perform communications in the macrocell. Thus, the present invention is useful in radio communications.

EXPLANATION OF THE REFERENCE NUMERALS 1 access type setting apparatus
11A observation unit
11B reception unit
12 calculation unit
13 determination unit
14 notification unit
15 setting unit

The invention claimed is:

1. An access type setting apparatus provided in a mobile communication system configured to allow a macrocell and a femtocell to geographically overlap with each other, the access type setting apparatus comprising:

a calculation unit configured to calculate an amount of interference from the femtocell to the macrocell; and
a determination unit configured to determine to set an access type of the femtocell to Open, which is an access type in which every mobile station is allowed to make an access, or Hybrid, which is an access type in which a mobile station belonging to a prescribed group is permitted to perform high quality communications while a mobile station not belonging to the prescribed group is permitted to perform best effort quality communications, when the amount of the interference exceeds a predetermined amount of interference.

2. The access type setting apparatus according to claim 1, wherein the determination unit determines the access type to be set in the radio base station configured to manage the femtocell, based on an instruction from a predetermined terminal when a plurality of access types settable to the radio base station configured to manage the femtocell are selected.

3. The access type setting apparatus according to claim 1, wherein the calculation unit calculates the amount of interference based on a measurement report from a mobile station located in the macrocell.

4. A mobile communication system configured to allow a macrocell and a femtocell to geographically overlap with each other, the mobile communication system comprising a radio access network device, wherein the radio access network device includes:

a calculation unit configured to calculate an amount of interference from the femtocell to the macrocell; and
a determination unit configured to determine to set an access type of the femtocell to Open, which is an access type in which every mobile station is allowed to make an access, or Hybrid, which is an access type in which a mobile station belonging to a prescribed group is permitted to perform high quality communications while a mobile station not belonging to the prescribed group is permitted to perform best effort quality communications, when the amount of the interference exceeds a predetermined amount of interference.

5. A mobile communication system configured to allow a macrocell and a femtocell to geographically overlap with each other, the mobile communication system comprising a core network device, wherein the core network device includes:

a calculation unit configured to calculate an amount of interference from the femtocell to the macrocell; and
a determination unit configured to determine to set an access type of the femtocell to Open, which is an access type in which every mobile station is allowed to make an access, or Hybrid, which is an access type in which a mobile station belonging to a prescribed group is permitted to perform high quality communications while a mobile station not belonging to the prescribed group is permitted to perform best effort quality communications, when the amount of the interference exceeds a predetermined amount of interference.

6. A mobile communication system configured to allow a macrocell and a femtocell to geographically overlap with each other, the mobile communication system comprising a radio gateway device, wherein the radio gateway device includes:

a calculation unit configured to calculate an amount of interference from the femtocell to the macrocell; and
a determination unit configured to determine to set an access type of the femtocell to Open, which is an access type in which every mobile station is allowed to make an access, or Hybrid, which is an access type in which a mobile station belonging to a prescribed group is permitted to perform high quality communications while a mobile station not belonging to the prescribed group is permitted to perform best effort quality communications, when the amount of the interference exceeds a predetermined amount of interference.

7. A mobile communication system configured to allow a macrocell and a femtocell to geographically overlap with each other, wherein a radio base station configured to control the femtocell includes:
   a calculation unit configured to calculate an amount of interference from the femtocell to the macrocell; and
   a determination unit configured to determine to set an access type of the femtocell to Open, which is an access type in which every mobile station is allowed to make an access, or Hybrid, which is an access type in which a mobile station belonging to a prescribed group is permitted to perform high quality communications while a mobile station not belonging to the prescribed group is permitted to perform best effort quality communications, when the amount of the interference exceeds a predetermined amount of interference.

8. An access type setting method for setting an access type to a radio base station configured to manage a femtocell in a mobile communication system configured to allow a macrocell and the femtocell to geographically overlap with each other, the method comprising the steps of:
   calculating an amount of interference from the femtocell to the macrocell; and
   determining to set an access type of the femtocell to Open, which is an access type in which every mobile station is allowed to make an access, or Hybrid, which is an access type in which a mobile station belonging to a prescribed group is permitted to perform high quality communications while a mobile station not belonging to the prescribed group is permitted to perform best effort quality communications, when the amount of the interference exceeds a predetermined amount of interference.

* * * * *